United States Patent [19]
Fletcher

[11] Patent Number: 5,655,305
[45] Date of Patent: Aug. 12, 1997

[54] HIGH PRECISION ELECTRONIC DIGITAL THERMOMETER

[76] Inventor: Taylor C. Fletcher, 1534 Sunny Crest Dr., Fullerton, Calif. 92635

[21] Appl. No.: 415,414

[22] Filed: Apr. 3, 1995

[51] Int. Cl.$^6$ .................................... G01K 7/24
[52] U.S. Cl. .......................... 374/170; 374/1; 374/168
[58] Field of Search .......................... 374/1, 163, 168, 374/170, 183; 324/601, 610, 725; 364/557

[56] References Cited

U.S. PATENT DOCUMENTS

| | | | |
|---|---|---|---|
| 3,933,046 | 1/1976 | Ebrecht | 374/183 |
| 4,000,454 | 12/1976 | Brakl | 374/168 |
| 4,528,637 | 7/1985 | Smith | 374/1 |
| 4,536,851 | 8/1985 | Germanton et al. | 364/557 |
| 4,537,516 | 8/1985 | Epstein | 374/1 |
| 4,713,783 | 12/1987 | Fletcher | 364/557 |

*Primary Examiner*—G. Bradley Bennett

[57] ABSTRACT

A microprocessor controlled high precision electronic digital thermometer which is capable of producing highly accurate temperature readings while using relatively inexpensive components. The digital thermometer of the invention uses a thermistor probe to obtain highly accurate temperature measurements which may be obtained over an extended temperature range. The digital thermometer of the invention is constructed in a manner such that by using relatively inexpensive stable resistors in a bridge, highly accurate temperature readings may be obtained by rapid calibration and recalibration of the bridge in order to obviate the need for expensive precision resistors in the bridge circuit itself.

10 Claims, 9 Drawing Sheets

| INSTRUMENT ACCURACY * |
| VS. TEMPERATURE |

| TEMP(C) | ACCURACY(C) |
|---|---|
| -20 | 0.016 |
| -10 | 0.015 |
| 0 | 0.015 |
| 10 | 0.015 |
| 20 | 0.015 |
| 30 | 0.015 |
| 40 | 0.017 |
| 50 | 0.019 |
| 60 | 0.023 |
| 70 | 0.029 |
| 80 | 0.037 |
| 90 | 0.049 |
| 100 | 0.066 |
| 110 | 0.088 |
| 120 | 0.117 |
| 130 | 0.156 |

*AMBIENT TEMPERATURE 18 TO 28c

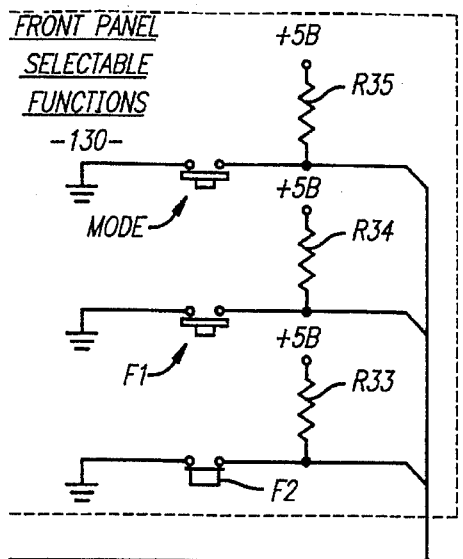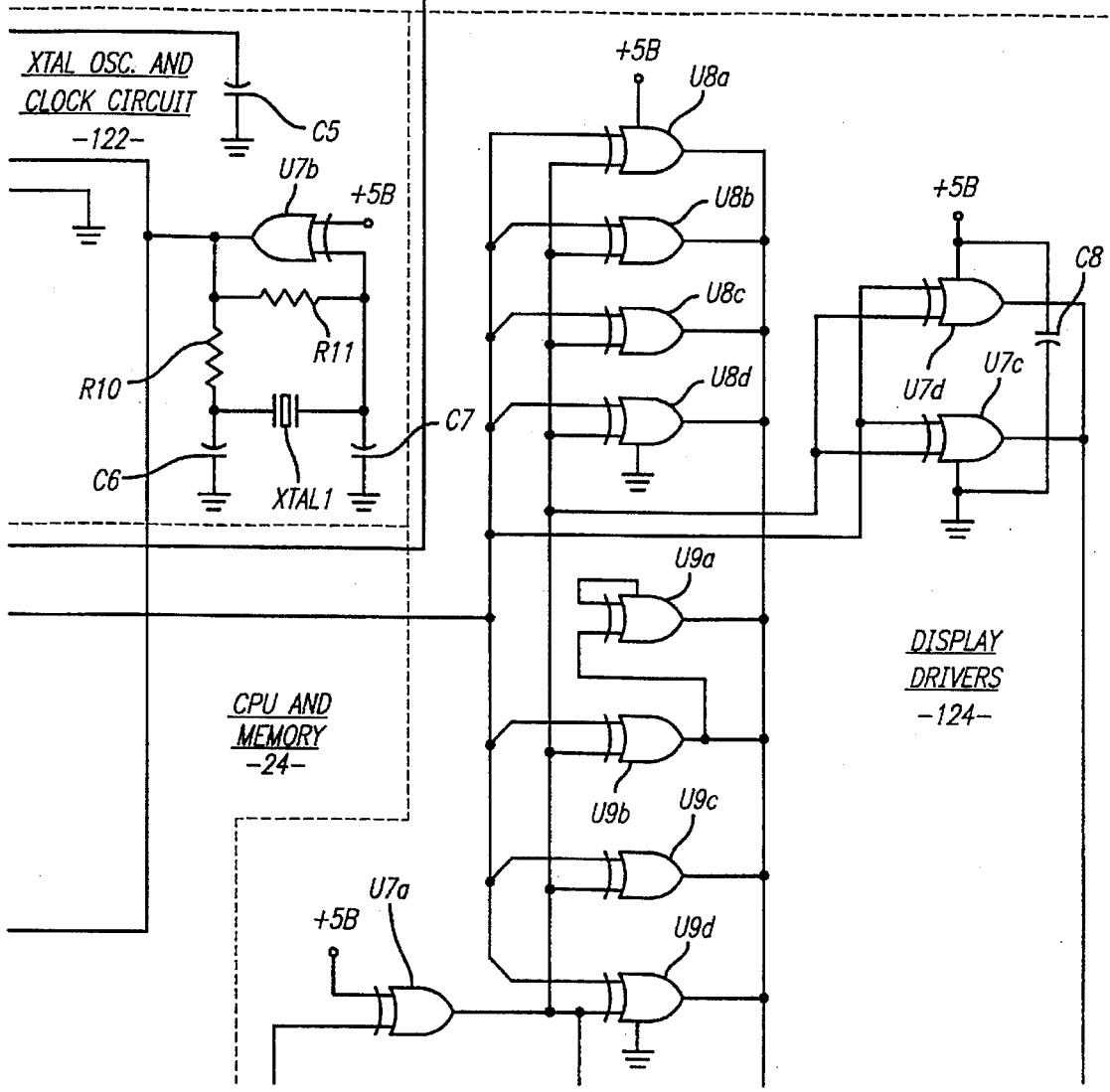
FIG. 5
| FIG. 5(A) | FIG. 5(B) | FIG. 5(C) |
| FIG. 5(D) | FIG. 5(E) | FIG. 5(F) |
FIG. 5(C)

HIGH PRECISION ELECTRONIC DIGITAL THERMOMETER

BACKGROUND OF THE INVENTION

A microprocessor controlled high precision electronic digital thermometer is provided which is capable of producing highly accurate temperature readings while using relatively inexpensive components. A constructed embodiment of the invention takes the form of a low cost, hand-held unit having performance capabilities equal to the performance capabilities of expensive laboratory-grade bench-top electronic digital thermometers.

The digital thermometer of the present invention is of the same general type as the digital temperature indicator system disclosed in U.S. Pat. No. 4,713,783 which issued Dec. 15, 1987 in the name of the present inventor. As in the system described in U.S. Pat. No. 4,713,783, the digital thermometer of the present invention uses a thermistor probe to obtain highly accurate temperature measurements which, in the case of the thermometer of the present invention, may be obtained over an extended temperature range.

In both systems, the thermistor probe controls a Wheatstone bridge which produces an analog signal when the thermistor probe causes the bridge to become unbalanced from a null point as the thermistor in the probe senses different temperatures. The analog signal from the bridge is converted into digital signals which are processed to control an appropriate temperature reading display.

Electronic digital thermometers are also described in U.S. Pat. No. 4,536,851 which issued Aug. 20, 1985 in the name of Germanton et al.

The electronic digital thermometer of the present invention is constructed in a manner such that while using relatively inexpensive stable resistors in the bridge, highly accurate temperature readings may be obtained, thereby obviating the need for expensive high precision resistors in the bridge such as required by the prior art high accuracy electronic digital thermometers.

The electronic digital thermometer of the present invention also has the feature in that it may be calibrated quickly and easily to exhibit extreme accuracy.

BRIEF DESCRIPTION OF THE DRAWINGS

FIGS. 5A–5F collectively form a circuit diagram of the digital thermometer represented by the block diagram of FIG. 4, when considered together in accordance with the table of FIG. 5.

DETAILED DESCRIPTION OF THE ILLUSTRATED EMBODIMENT

Figures 1, 2:
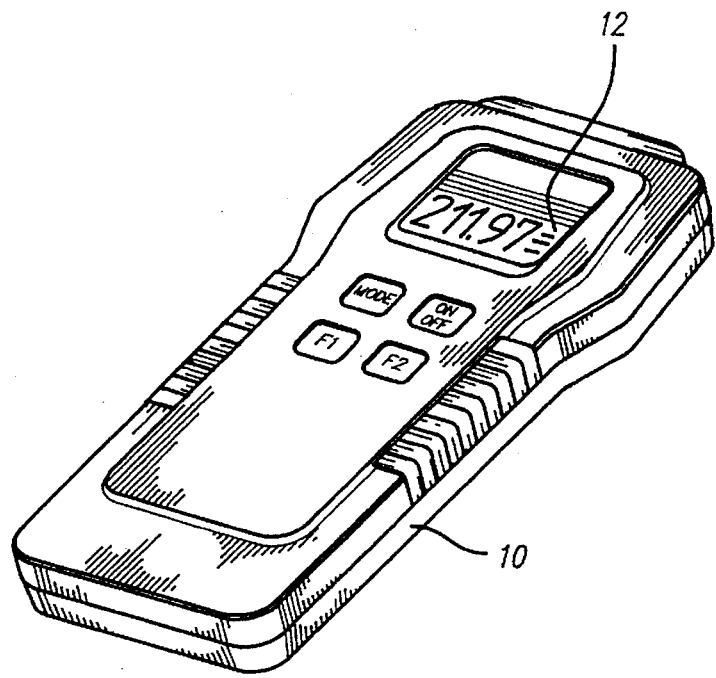
FIG. 1 is a perspective view of a hand-held embodiment of a thermometer which may incorporate the concept of the present invention.
FIG. 2 is a table illustrating the instrument accuracy versus temperature of a typical digital thermometer constructed in accordance with the teachings of the present invention.

A hand-held electronic digital thermometer is shown in FIG. 1 which includes a casing 10 configured to be grasped in the hand of the user. A liquid crystal display (LCD) 12 is visible through the top of casing 10. The liquid crystal display indicates the temperatures sensed by a thermistor probe connected to the thermometer. Appropriate keys are mounted on the top of the casing 10, and these keys are designated "ON/OFF," "MODE," and a pair of function keys designated "$F_1$" and "$F_2$." All functions may be accessed through the MODE key and through the function keys $F_1$ and $F_2$.

The thermometer of FIG. 1 may be constructed in accordance with the teachings of the present invention to have a high accuracy of up to ±0.015° C. through a temperature range of −20° C. through 130° C., as indicated by the table of FIG. 2. The instrument accepts conventional Yellow Springs Instruments (YS51) Series 400 thermistor probes. It should be pointed out that the specifications listed above and in the table of FIG. 2 are for descriptive purposes only, and are not intended to limit the invention in any way.

Figure 3:
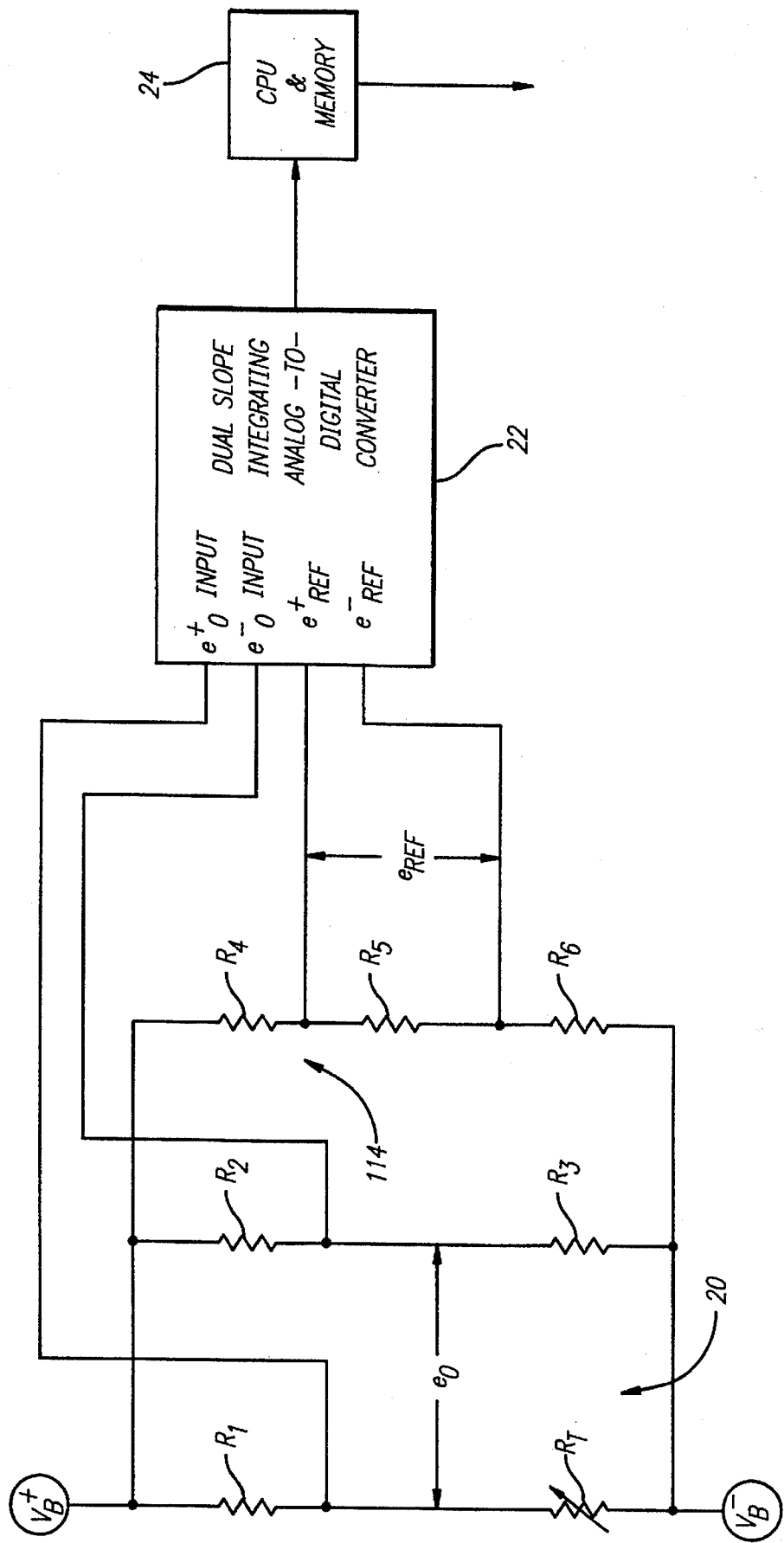
FIG. 3 is a circuit diagram illustrating the basic bridge circuit of the digital thermometer of the present invention and certain associated basic components.

The circuit of FIG. 3 includes a Wheatstone bridge 20 which is connected to a dual slope integrating analog-digital converter 22. The digital output of the converter is applied to a central processing unit (CPU) 24. Bridge 20 is formed of three resistors designated $R_1$, $R_2$ and $R_3$ of selected fixed individual resistances, and of a variable resistor $R_T$ representing the resistance of the sensing element of the thermistor probe which is connected to the thermometer. The resistors $R_1$, $R_2$ and $R_3$ and the thermistor resistance $R_T$ are connected, as shown, between the positive and negative terminals of a unidirectional voltage source $V_B$.

As mentioned above, the variable resistance element $R_T$ is the sensing element of a thermistor probe. The voltage of source $V_B$ is also applied across a reference circuit 114 comprised of three additional resistors $R_4$, $R_5$ and $R_6$. The reference circuit develops a reference voltage $e_{ref}$ across resistor $R_5$. The reference voltage $e_{ref}$ is proportional to the voltage applied across the bridge 20.

The bridge output voltage $e_o$ and the reference voltage $e_{ref}$ are applied to the analog-digital converter 22, as shown in FIG. 3. By using a stable analog-digital converter and stable resistors $R_1$–$R_6$, fairly accurate analog-digital converter readings may be obtained for all temperatures sensed by the thermistor probe which lie within the range of the instrument, as shown, for example, in the table of FIG. 2. More accurate readings may be realized using precision resistors $R_1$–$R_6$ which are not only extremely stable, but also extremely precise insofar as their stated individual resistances are concerned. However, the use of such precision resistors renders the instrument excessively expensive.

An objective of the present invention is to achieve the more accurate temperature readings by an electronic digital thermometer without the requirement for expensive extremely precise resistors R1–R6, this being achieved by making the temperature readings solely dependent on the thermistor resistance $R_T$ and independent of the actual resistances of resistors $R_1$–$R_6$.

In accordance with the teaching of the present invention, and by sequentially connecting three precision resistors $R_{A0}$, $R_{A1}$ and $R_{A2}$ into the bridge circuit in place of the thermistor resistance $R_T$ during a calibration mode. The bridge 20 may then be calibrated to provide extremely accurate temperature readings, even though the bridge utilizes less expensive resistors $R_1$–$R_6$ which, although stable, are not extremely precise.

The dual slope analog-digital converter (ADC) 22 may be an integrated circuit of the type presently manufactured by Teledyne Components Company, consisting of a pair of integrated circuits designated TC500A and TC520. The present circuit minimizes the rollover error when the input polarity is reversed. Typically, this type of ADC uses a reference capacitor C14 (FIG. 3) connected to the reference voltage $e_{ref}$. During the deintegration phase of the analog-to-digital conversion, the reference capacitor is disconnected from the reference voltage, and one side of the reference capacitor C14 is switched to analog ground while the other side of the reference capacitor is switched to the input of the integrating circuit in the ADC. This means that the reference voltage applied to the integrating circuit is of a polarity opposite to that of input signal $e+_0-e-_0$.

Most prior art systems are designed so that the negative reference is held near the analog ground potential. In the circuit of FIG. 3, the voltage in the resistor $R_5$ is balanced so that $e+_{ref}$ and $e-_{ref}$ applied to the analog-to-digital converter 22 are symmetrical with respect to analog ground. There are stray capacities between the reference capacitor $C_{14}$ and the analog ground. These stray capacities affect the voltage across the reference capacitor $C_{14}$ when the reference capacitor $C_{14}$ is connected between analog ground and the input of the integrating circuit in the ADC. In the usual circuit where $e-_{ref}$ is close to the analog ground potential there is essentially no change in the voltage across the reference capacitor $C_{14}$ when the negative terminal of the capacitor $C_{14}$ is switched to ground, but a significant change occurs when the positive terminal is switched to ground. This changes the analog-to-digital scaling for positive and negative input voltages, which creates the rollover error. In the circuit of the present invention, the stray capacities from each side of the reference capacitor $C_{14}$ are held to the analog ground to be similar. Therefore, it makes no difference whether the positive or negative side of the reference capacitor $C_{14}$ is connected to analog ground. In both cases the voltage across the reference capacitor $C_{14}$ is decreased by the same amount and there is no appreciable rollover error.

In the practice of the present invention a procedure has been developed by which three precision resistors $R_{A0}$, $R_{A1}$ and $R_{A2}$ are sequentially connected into the Wheatstone bridge circuit in the place of the thermistor resistance $R_T$, and the corresponding three analog-digital converter readouts $A_0$, $A_1$ and $A_2$ are used in CPU 24 to solve three equations. The three equations may be simplified by making $R_{A1}$ equal 0. In that specific case, the equations which are implemented are as follows:

$$R1 \frac{(A_0-A_2)(R_{A0}R_{A2})}{A_2R_{A0}+A_1(R_{A2}-R_{A0})-A_0R_{A2}} \qquad 1$$

$$K_1 = \frac{(A_2-A_1)(R_1+R_{A2})}{R_{A2}} \qquad 2$$

$$K_2 = \frac{R_3}{R_2+R_3} = \frac{-A_1}{K_1} \qquad 3$$

The values $R_1$, $K_1$ and $K_2$ are constants which are developed by the CPU 24, and which are stored in memory.

In the event that $R_{A1}$ does not equal 0, the resulting equations, while similar to the Equations 1, 2 and 3, are more complex. However, one still needs only to substitute the three resistors $R_{A0}$, $R_{A1}$ and $R_{A2}$ in the bridge circuit of FIG. 3 for the thermistor resistance $R_T$ to produce the three analog-digital converter readouts $A_0$, $A_1$ and $A_2$ in order for the CPU to solve the three equations and produce the three constants $R_1$, $K_1$ and $K_2$.

When the system of FIG. 3 is changed from its calibrate mode to its measurement mode, the appropriate thermistor probe is connected into the circuit of FIG. 3 which has a resistance $R_T$ of unknown value and which represents the thermistor reading of a particular temperature. When the system is in its measurement mode, the resistance $R_T$ is used together with the values of the constants $R_1$, $K_1$ and $K_2$ which are stored in the CPU memory, together with the analog-digital converter readout $A_T$ in order to calculate the true value of $R_T$ and to enable the thermometer circuit to display a precise reading of the temperature represented by the thermistor. The calculation is in accordance with the following equation:

$$R_T = \frac{(A_T-A_1)R_1}{K_1+A_1-A_T} \qquad 4$$

In Equation 4, the $-A_1/K_1$ is substituted for $K_2$.

Quality thermistor probes have characteristics which may be expressed by the following equation (known as the Steinhart & Hart equation):

$$\frac{1}{T} = a_0 + a_1(\log_e R_T) + a_2(\log_e R_T)^2 + a_3(\log_e R_T)^3 \qquad 5$$

Where: $a_0$, $a_1$, $a_2$, $a_3$ are constants for a particular thermistor or thermistor family; T is the temperature of the thermistor in Kelvins; $R_T$ is derived from Equation 4.

The accuracy is improved if the probe's lead resistance, which is a small but nearly fixed resistance, is subtracted out before solving Equation 5.

A correction for the thermometer's self-heating also may be made. The thermistor is heated by the current which flows through it. The value of the power dissipated is calculated ($P=I^2R_T$). The temperature change due to the self-heating is then calculated and subtracted from the calculated temperature to give the true temperature of the fluid in contact with the thermistor probe.

Precision thermistors are specified to meet Equation 5 with a given accuracy. This accuracy may be increased over a limited range by substituting $K_F R'_T$ for $R_T$ in Equation 5. $K_F$ is obtained by setting the temperature of the calibration bath to a temperature $T_0$, which is usually the center of the range of interest. $R'_{T0}$ is the measured resistance of the thermistor probe at that temperature. $K_F$ is given by:

$$K_F = \frac{R_{T0}}{R_{T0}'} \qquad 6$$

Where: $R_{T0}$ is the idealized resistance of the probe at $T_0$.

To establish very precise measurements of wider temperature spans the curve of FIG. 2 may be modified with another derived constant $K_H$, as will be described.

Specifically, the thermometer of the present invention will meet the specifications listed in the table of FIG. 2 when an idealized or perfect thermistor probe is used. In order to hold the price of the probe at a reasonable level, the probe manufacturers will typically specify accuracy of the probe over a temperature span. A typical specification is ±0.1° C. between 0° C. and 75° C.

Then, if the thermometer of the invention and probe are calibrated together at one or two temperatures, the accuracy at those one or two temperatures for the thermistor probe/thermometer combination will meet those specified in the table of FIG. 2.

The thermistor probes used with the thermometer of the invention have similar resistance/temperature curves. The thermistors are trimmed at some selected temperature, for example 25° C., to meet their published specifications.

In order to achieve high accuracy over a narrow range, the following steps are followed:

(1) The thermistor probe is placed in a temperature-controlled bath at a temperature $T_O$;

(2) The resistance of the probe ($R'_{TO}$) as measured by the thermometer circuit of the invention is read;

(3) The thermometer circuit calculates the idealized probe resistance ($R_{TO}$) for the bath's temperature;

(4) A constant $K_F=R_{TO}/R'_{TO}$ is stored.

Equation 4 now is changed to:

$$R_T = \left[ \frac{(A_T - A_1)R_1}{K_1 + A_1 - A_T} \right] K_F \qquad 7$$

The thermistor probe/thermometer combination will then have very high accuracy over a range typically ±15° C. about $T_O$.

In order to increase the accuracy over a wider range, a second constant $K_H$ is derived. For that purpose, the probe is placed in a bath at a temperature $T_1$. The temperature is read by the thermistor probe/thermometer combination as $T'_1$. Then $K_H$ is derived.

$$K_H = \frac{(T_1' - T_1)}{(T_0 - T_1')} \qquad 8$$

The following steps are then followed in making a temperature measurement with the combination thermistor probe/thermometer:

(1) Equation 7 is used to solve for $R_{TX}$;

(2) Equation 5 is used to solve for $T''_X$;

(3) The following equation 9 is used to derive the temperature $T_X$.

$$T_X = T''_X + (T''_X - T_0)K_H \qquad 9$$

The foregoing provides complete corrections at temperatures $T_0$ and $T_1$, and very good corrections over an extended temperature range.

Figure 4:
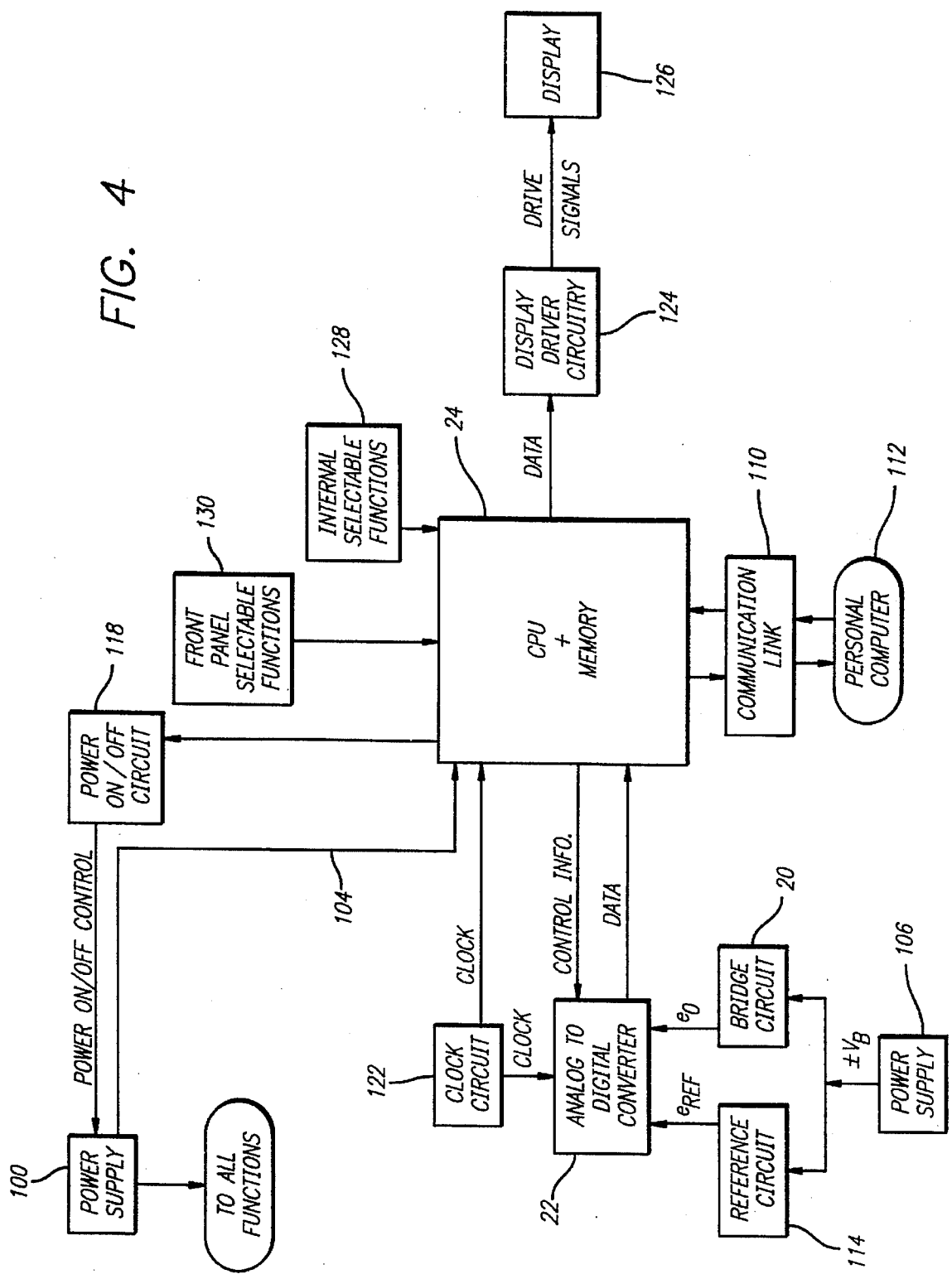
FIG. 4 is a block diagram of a digital thermometer which may be constructed to incorporate the teachings of the present invention.

A block diagram of an electronic digital thermometer which may be constructed in accordance with the teachings of the present invention is shown in FIG. 4. The circuitry of FIG. 4 includes a ±5 volt DC power supply 100 which provides power for all of the components of the circuit except for the bridge 20. Power supply 100 also provides a "low battery" signal over lead 104 the CPU 24 which includes a microprocessor and a memory. A ±2.5 volt DC power supply 106 supplies power to the bridge 20.

The analog-digital converter 22 supplies data to the CPU 24 and receives control information from the CPU, as shown. A communication link represented by block 110 provides communication between the CPU 24 and peripheral equipment, such as a personal computer 112. The reference circuit formed by resistors R4, R5 and R6 in FIG. 3 is represented by block 114 in FIG. 4, and it supplies the reference voltage $e_{ref}$ to the analog-digital converter 22. The bridge 20 supplies the bridge voltage $e_o$ to the analog-digital converter.

A power ON/OFF circuit is represented by block 118. This circuit provides a power shutdown signal to power supply 100 in response to either the front panel ON/OFF switch or a CPU time out signal. The system also includes a crystal oscillator clock circuit 122 which supplies clock signals to CPU 24 and to the analog-digital converter 22.

The CPU 24 supplies data signals to a display driver circuit represented by block 124 which, in turn, applies drive signals to a display circuit represented by block 126. The display circuit controls the liquid crystal display 12 of FIG. 1. Selectable functions control circuitry is represented by block 128, which supplies selected inputs to CPU 24. Front panel functions are represented by Block 130 which supplies selected inputs to the CPU.

Circuit details of the various blocks of FIG. 4 are shown in FIGS. 5A–5F.

Figure 5A:
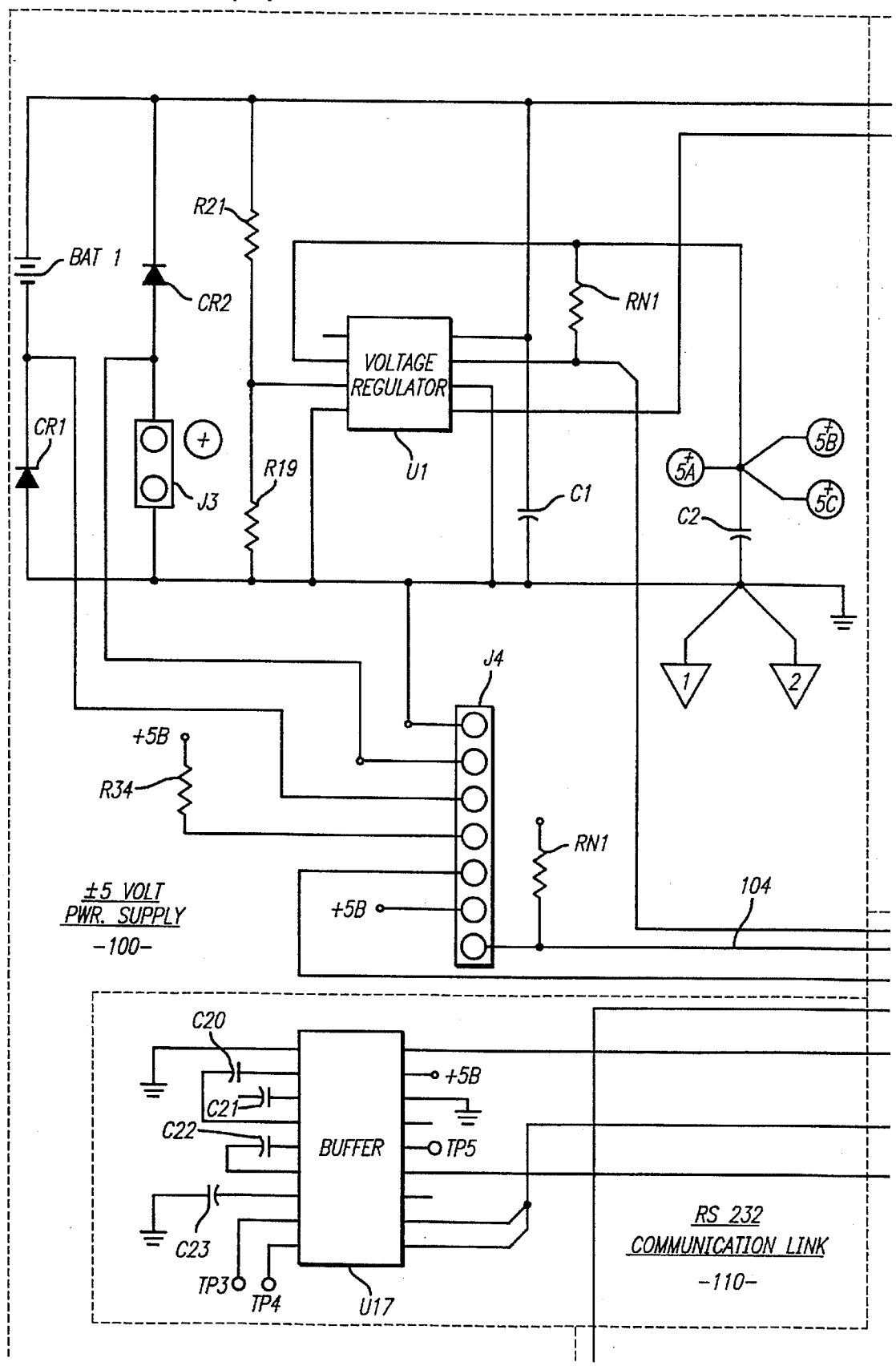
Figure 5B:
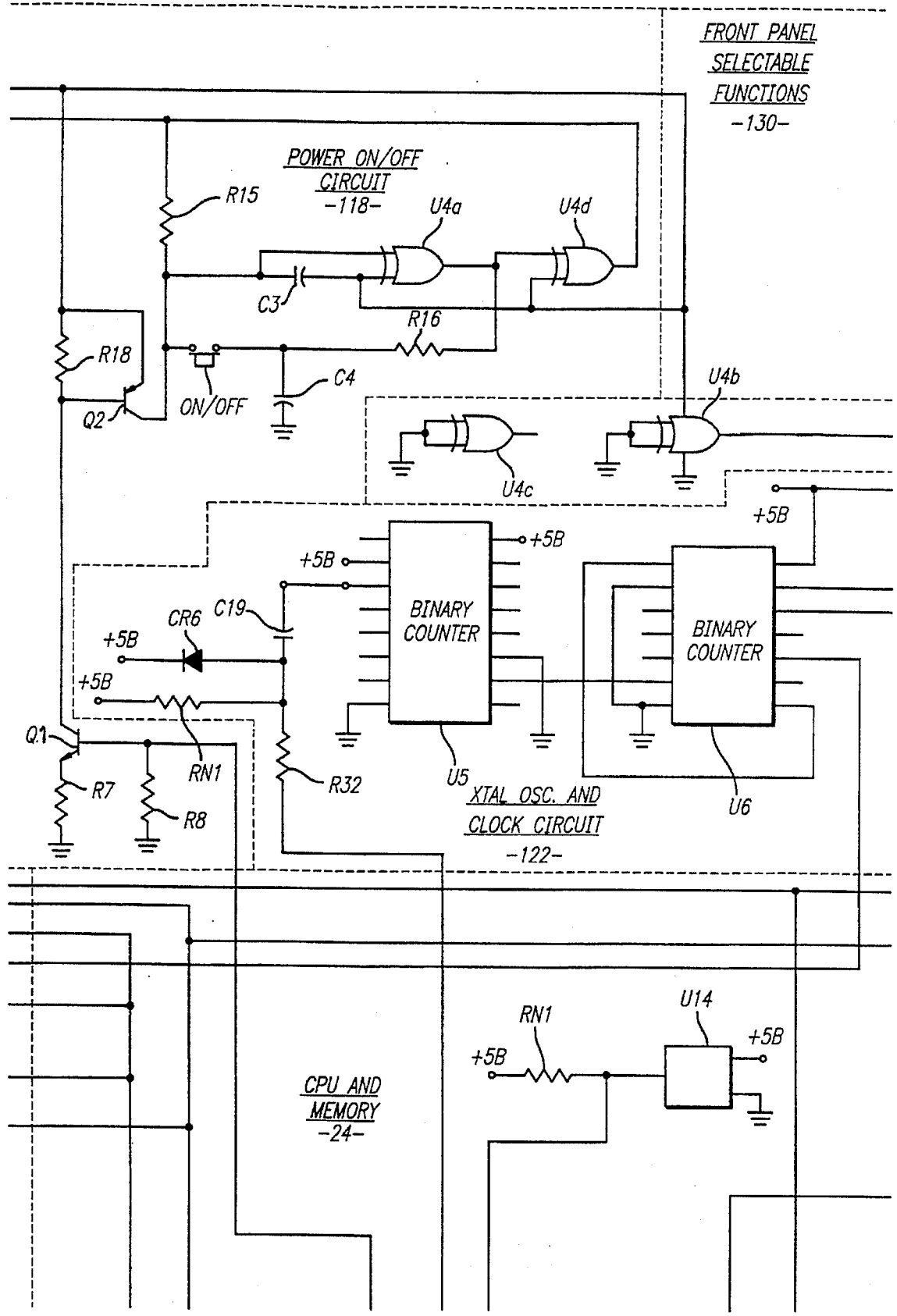

As shown in FIG. 5A, the ±5 volt power supply 100 includes a battery designated BAT 1, or alternatively the power supply may be connected to a 9 or 12 volt external DC power source through a connector J3. The power supply 100 includes an integrated circuit U1 which may be of the type designated MAX667, and it functions as a voltage regulator to provide a regulated +5 volt output across a capacitor C2. The power supply 100 also includes a second integrated circuit U2 (FIG. 5D) of the type designated TC7660 which also serves as a voltage converter which provides a 5-volt negative voltage across a capacitor C10.

Figure 5D:
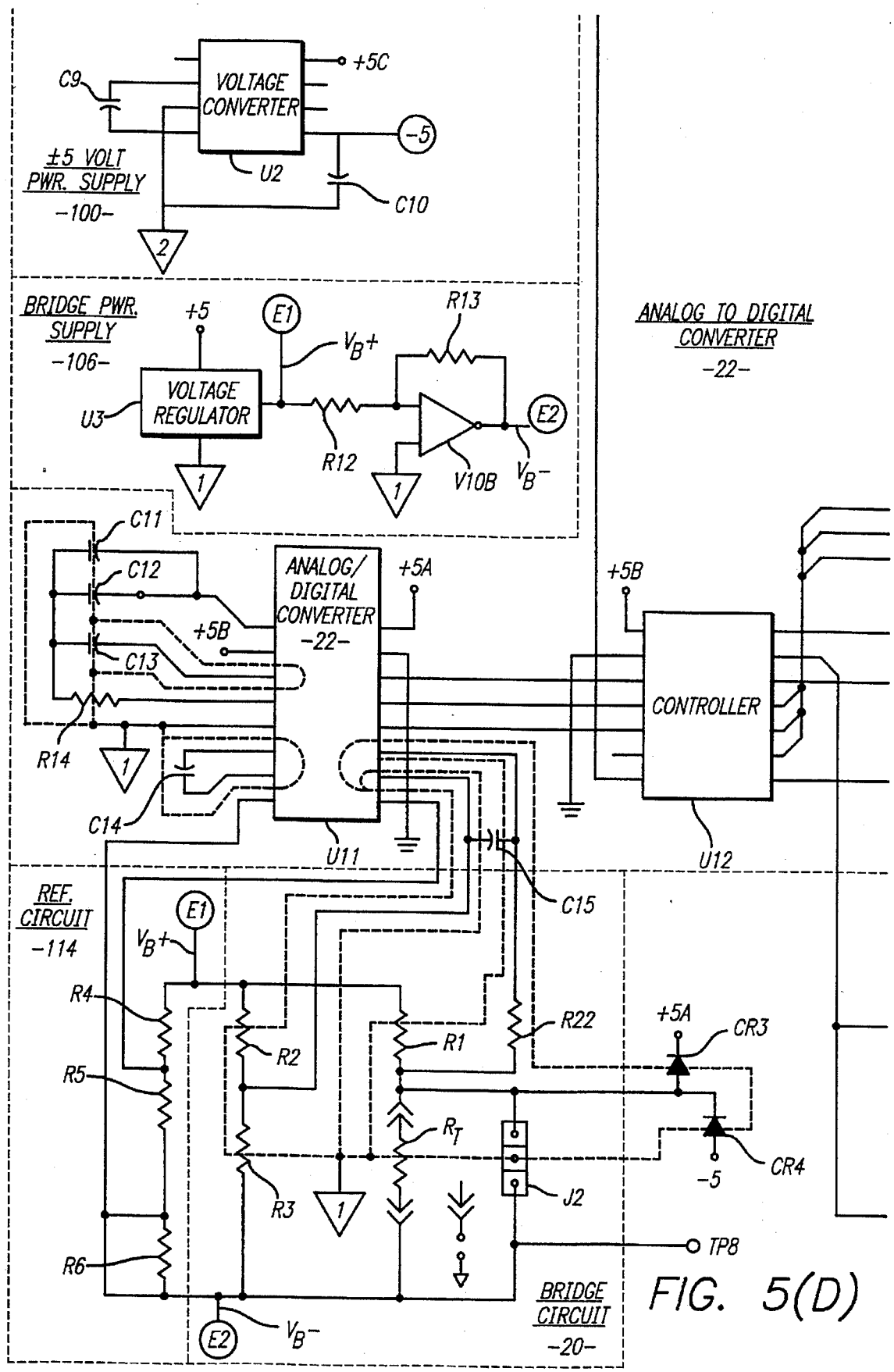
Figure 5E:
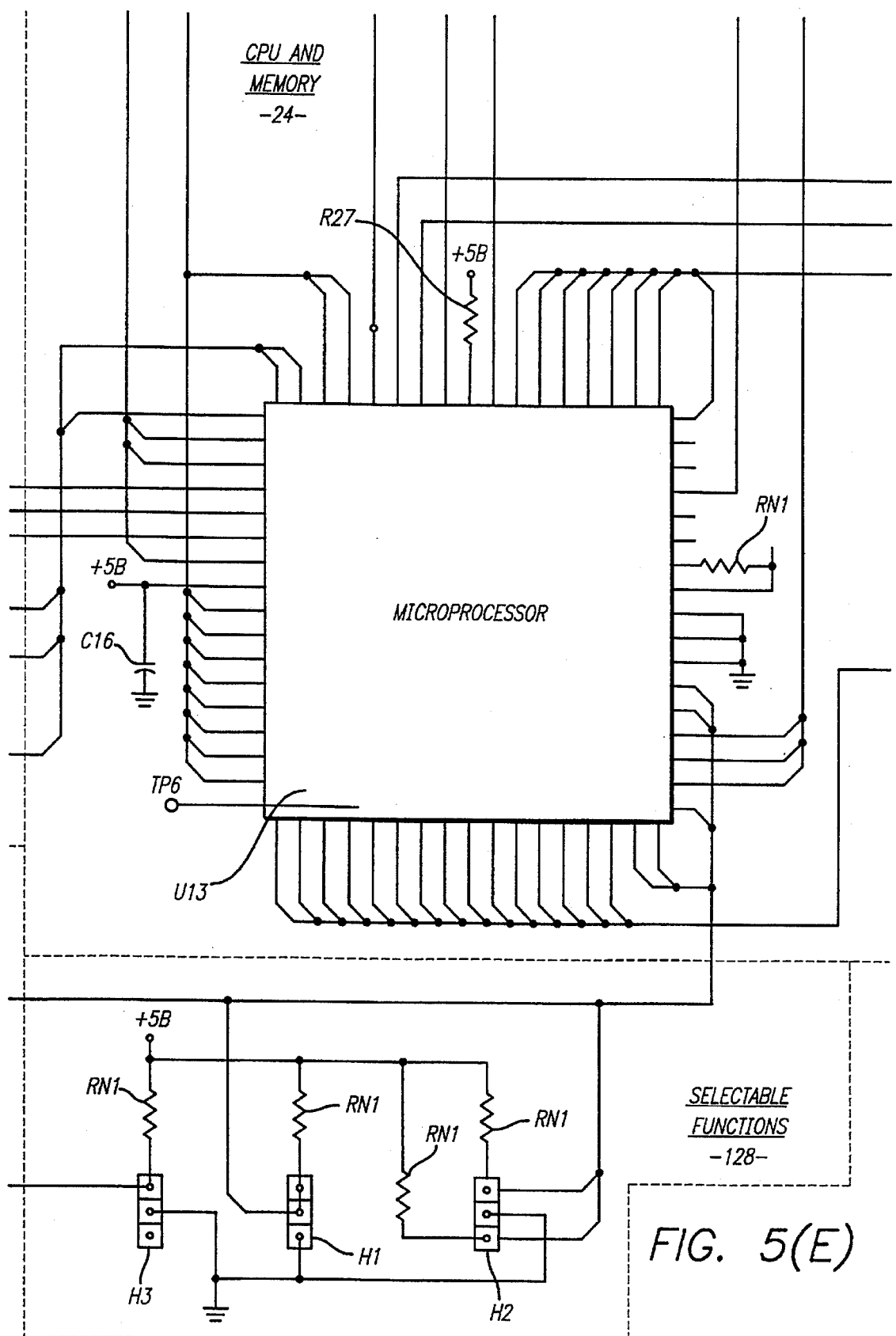

The bridge power supply 106 (FIG. 5D) includes an integrated circuit U3 of the type designated TLE2425 which provides highly stable low noise +2.5 volts ($V+_B$) at output terminal E1. This voltage is also supplied to an operational amplifier V10B which provides a stable −2.5 voltage ($V-_B$) at terminal E2. Operational amplifier V10B may be of the type designated LM442. The value of the negative voltage may be adjusted by changing the value of resistor R13. The voltages $V+_B$ and $V-_B$ at terminals E1 and E2 are applied respectively to the top and bottom of bridge 20 and reference circuit 114, as shown in FIG. 5D.

Analog-digital converter 22 (FIG. 5D) includes a pair of integrated circuits U11 and U12 of the types designated as TC500A and TC520, which together form an integrating, dual slope, analog-to-digital converter.

The bridge circuit 20 and reference circuit 114 are connected to the analog-to-digital converter, as explained above in conjunction with FIG. 3. The output voltage of the bridge circuit 20 is a function of the resistance $R_T$ of the thermistor probe which, in turn, is a function of the temperature sensed by the thermistor probe. The bridge output voltage $e_0$ is applied to the integrated circuit U11 of the analog-digital converter 22 it is integrated in U11 for a selected time ($t_1$). The reference voltage $e_{ref}$ which appears across resistor R5 in reference circuit 114 is also applied to integrated circuit U11 of the analog-digital converter. The integrated circuit U11 applies the reference voltage to the analog-digital converter 22 with a polarity opposite to the polarity of the bridge voltage $e_o$. The reference voltage $e_{ref}$ drives the output of integrated circuit U11 back to zero in a time ($t_2$). The ratio of $t_2/t_1$ is an accurate measurement of $e_o/e_{ref}$. Therefore, $e_o/e_{ref}=t_2/t_1$. Since the bridge power supply voltage $V+_B$, $V-_B$ is also applied to the reference circuit 114, the output of the analog-digital converter 22 is independent of variations in the bridge power supply output voltages. The analog-digital converter transmits its output data to the CPU 24 (FIG. 5E) whenever the microprocessor U13 in the CPU requests the data. The microprocessor U13 may be of the type designated MC68HC11F1.

The RS232 communication link 110 (FIG. 5A) includes an integrated circuit U17 of the type designated MAX242. This integrated circuit provides the drivers and receivers necessary to establish a communication link between the CPU 24 and peripheral devices, such as the personal computer 112 referred to in the description of FIG. 4.

As described above in conjunction with FIG. 3, the reference circuit 114 provides the reference voltage $e_{ref}$ to the analog-digital converter 22. The reference voltage $e_{ref}$ is a fixed fraction of the bridge voltage ($E_{bb}$). Where $E_{bb}=E_1-E_2$. Specifically:

$$e_{ref} = \left( \frac{R_5}{R_4 + R_5 + R_6} \right) E_{bb}$$

The reference resistors $R_4$, $R_5$ and $R_6$ are stable resistors. However, they need not be expensive, high precision resistors.

As described above in conjunction with FIG. 3, the bridge circuit 20 is a Wheatstone bridge, one leg of which is the resistance $R_T$ of the thermistor probe. The bridge output voltage $e_o$ is a function of the resistance $R_T$ of the thermistor probe and of the bridge voltage $E_{bb}$. The bridge resistors $R_1$, $R_2$ and $R_3$, as described above, are stable resistors, however they need not be expensive, high precision resistors.

The voltage $e_0$ may be expressed by the following equation:

$$e_0 = \left[ \left( \frac{R_T}{R_1 + R_T} \right) - \left( \frac{R_3}{R_2 + R_3} \right) \right] E_{bb}$$

The power ON/OFF circuit 118 (FIG. 5B) includes a pair of exclusive OR gates U4a and U4d. These gates may be of the type designated 4070. They are used as a toggle which is driven by the manually operated switch designated ON/OFF, which is also shown in FIG. 1. The output of exclusive OR gate U4d places the regulator U1 in the power supply 100 (FIG. 5A) in either its operating/regulating mode or its shutdown mode. The microprocessor U13 (FIG. 5E) may also set the U4a/U4d toggle of the power ON/OFF circuit 118 in the shutdown mode by means of a control signal which is applied to the toggle through the circuits of transistors Q1 and Q2. Transistor Q1 may be of the type designated PN2907A, and transistor Q2 may be of the type designated PN2222A. The front panel selectable function circuit consists of front panel switches designated "MODE," "$F_1$" and "$F_2$" (FIGS. 1 and 5C). These keys introduce signals to the microprocessor U13 which are used to provide various functions such as having the readout in °C., °F.; hold current reading; display maximum temperature; display minimum temperature. The internal selectable functions can provide override functions such as (1) "no auto power off;" (2) "readings always in °C."

The crystal oscillator and clock circuit 122 (FIGS. 5B and 5C) includes an 8 MHz crystal oscillator circuit which, in turn, includes a crystal designated XTAL1 and an exclusive OR gate U7b which may be of the type designated 74HC86. Integrated circuits U5 and U6 are binary counters of the type designated CD4020 and 74HC393 respectively. Counter U6 supplies clock signals to the analog-digital converter and to the microprocessor U13. The microprocessor U13 and memory U15 (FIGS. 5E and 5F) form the computing and control system CPU 24 for the thermometer. The memory U15 is a read only memory (ROM) of the type designated NMC27C256. The program for the microprocessor is stored in the read only memory (ROM) U15, constants applicable to a particular instrument or thermistor probe are stored in an electrically erasable programmable read only memory (EEPROM). The latter memory is part of U13.

The CPU 24 sets the integrating period of the analog-digital converter 22. The CPU directs the analog-digital converter to download its output to the CPU. The CPU then calculates the following:

(1) Resistance of the thermistor probe including the resistance of both the thermistor and probe leads;
(2) Resistance of the thermistor;
(3) Temperature of the thermistor;
(4) Power dissipated in thermistor due to bridge current;
(5) Temperature change in thermistor due to self heating;
(6) Temperature of media surrounding or in contact with the thermistor probe;
(7) Converts output to desired temperature scale—Celsius, Fahrenheit or Kelvin.

Figure 5F:
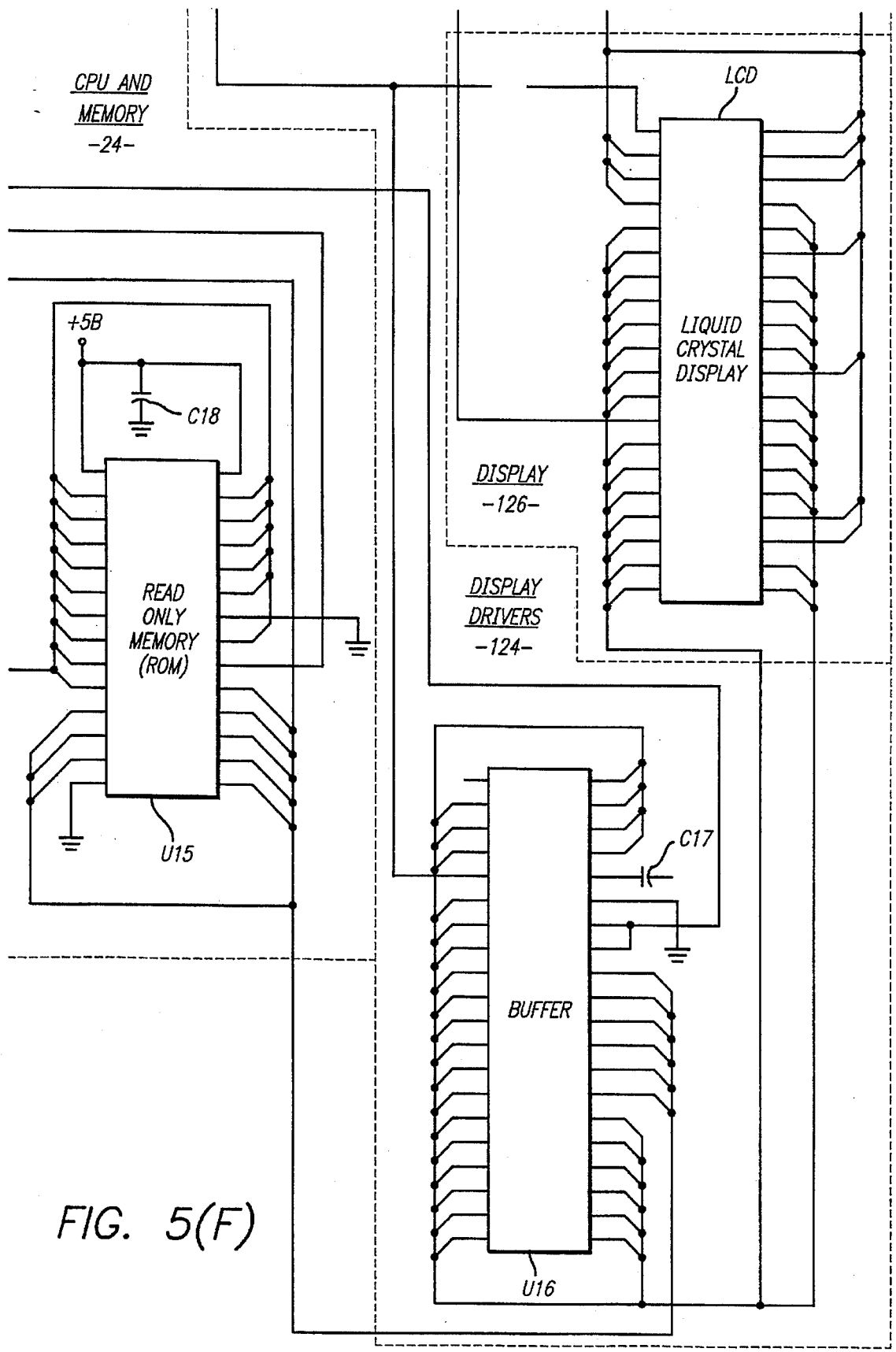

The CPU 24 sends the temperature signals to the display drivers 124 (FIGS. 5C and 5F). It also sends display messages such as degrees C., degrees F., K., HOLD and LOW BATTERY to the display drivers 124. The CPU 24 also performs timing functions and if requested will transmit information at predetermined intervals, or turn off the thermometer when it has been on for some selected period of time. U14 (MC34164) (FIG. 5B) shuts down the CPU whenever the +5 voltage drops below a predetermined value.

U16 (FIG. 5F) in the display driver circuit 124 acts as a buffer and stores data from the CPU 24. U16 may be an integrated circuit of the type designated TC7211AM. The display driver circuit generates the low frequency square wave (approximately 100 Hz) required to drive the liquid crystal display (LCD) 126. The driver circuit 124 converts hexadecimal data into the drives required for the seven-segment displays of the LCD 126. The driver circuit 124 is made up of a multiplicity of exclusive OR gates U7a, U7c, U7d, U8a–U8d, U9a–U9d (FIG. 5C) which are used to drive or blank specific messages, and to drive the seven segments of the most significant digit of the display. The exclusive OR gate U7a–U7d is of the type designated 74HC86; and the exclusive OR gates U9a–U9d are of the type designated 4070, as are the exclusive OR gates U8a–U8d.

The display 126 (FIG. 5F), is a liquid crystal display with five 7-segment digits and a number of messages which can be turned on and off. Typical messages are TEMPERATURE SCALE (degrees C., degrees F. or K.), HOLD, LOW BATTERY, MAX or MIN.

The values of the various elements of the circuit of FIGS. 5A–5F are as follows:

| Power Supply 100 (FIGS. 5A, 5B) | |
|---|---|
| Resistor R21 - 4.75 MΩ | Capacitor C1 - 15 µF |
| Resistor R19 - 1.33 MΩ | Capacitor C2 - 68 µF |
| Resistor RN1 - 22 kΩ | Capacitor C10 - 15 µF |
| Resistor R34 - 22 kΩ | Capacitor C9 - 15 µF |
| Resistor RN1 - 22 kΩ | |

| Power Supply 106 (FIG. 5D) | |
|---|---|
| Resistor R12 - 10.0 kΩ | Resistor R13 - 1.62 kΩ |

| Analog-Digital Converter 22 (FIG. 5D) | |
|---|---|
| Capacitor C11 - .10 µF | Capacitor C15 - .01 µF |
| Capacitor C12 - .22 µF | Resistor R14 - 100 kΩ |
| Capacitor C13 - .47 µF | |
| Capacitor C14 - .47 µF | |

| Reference Circuit 114 (FIG. 5D) |
|---|
| Resistor R4 - 10.33 kΩ |
| Resistor R5 - 3.700 kΩ |
| Resistor R6 - 0.0 Ω |

| Bridge Circuit 20 (FIG. 5D) | |
| --- | --- |
| Resistor R22 - 20.0 kΩ | Resistor R3 - 1.500 kΩ |
| Resistor R2 - 10.33 kΩ | Resistor R1 - 10.33 kΩ |

| Power ON/OFF Circuit 118 (FIG. 5B) | |
| --- | --- |
| Resistor R15 - 1 MΩ | Capacitor C4 - .1 μF |
| Resistor R16 - 4.75 MΩ | Capacitor C3 - 1000 pF |
| Resistor R18 - 10 kΩ | |
| Resistor R7 - 10 kΩ | |
| Resistor R8 - 10 kΩ | |

| Crystal Oscillator & Clock Circuit 122 (FIG. 5B and 5C) | |
| --- | --- |
| Resistor RN1 - 22 kΩ | Capacitor C5 - .1 μF |
| Resistor R10 - 1 kΩ | Capacitor C6 - 56 pF |
| Resistor R11 - 1 MΩ | Capacitor C7 - 47 pF |
| Resistor R32 - 22 kΩ | Capacitor C19 - 470 pF |

| CPU and Memory 24 (FIG. 5E) |
| --- |
| Resistor RN1 - 22 kΩ |
| Capacitor C16 - .1 μF |
| Capacitor C18 - .1 μF |

| Internal Selectable Functions 128 (FIG. 5E) |
| --- |
| Resistors RN1 - 22 kΩ |

| Front Panel Selectable Functions 130 (FIG. 5C) |
| --- |
| Resistors R33, R34, R35 - 100 kΩ |

The invention provides, therefore, a microprocessor controlled electronic digital thermometer which is capable of providing highly accurate temperature readings with relatively inexpensive components.

While a particular embodiment of the invention has been shown and described, modifications may be made, and it is intended in the following claims to cover all such modifications which fall within the true spirit and scope of the invention.

I claim:

1. A temperature indicating system comprising: a temperature sensor having a variable electric resistance ($R_T$) which is a function of the temperature being sensed by the sensor; a bridge circuit having four arms formed respectively by a first resistor ($R_1$), a second resistor ($R_2$), a third resistor ($R_3$) and the resistance ($R_T$) of the temperature sensor, said bridge circuit producing an analog bridge voltage ($e_O$); an analog-to-digital converter connected to said bridge circuit for converting the analog voltage ($e_O$) therefrom into corresponding temperature-indicating digital signals; a microprocessor connected to said analog-to-digital converter for processing the temperature-indicating digital signals therefrom to produce a digital output signal precisely representing the temperature sensed by said temperature sensor; a memory; first circuitry connecting said microprocessor to said memory for causing said memory to receive first, second and third modifying signals from said microprocessor to be stored in said memory, and for subsequently transmitting said modifying signals to said microprocessor to be used by the microprocessor in the processing of said temperature-indicating signals from said analog-to-digital converter to cause said digital output signals to represent precisely the temperature sensed by said temperature sensor; display means; and circuitry connecting said microprocessor to said display means and responsive to said digital output signals from said microprocessor to cause said display means to exhibit the precise temperature sensed by said temperature sensor.

2. The temperature indicating system defined in claim 1 in which said analog-to-digital converter is of the dual slope integrating type and in which said system includes a reference circuit for producing a reference voltage ($e_{ref}$) for said analog-to-digital converter.

3. The temperature indicating system defined in claim 2, and which includes a common voltage source for said bridge circuit and said reference circuit so that any variations in said bridge voltage ($e_O$) due to fluctuations in the voltage from said voltage source also arise in said reference voltage ($e_{ref}$).

4. The temperature indicating system defined in claim 1, in which said first modifying signal is computed in said microprocessor from an equation $$R1 = \frac{(A_0 - A_2)(R_{A0}R_{A2})}{A_2R_{A0} + A_1(R_{A2} - R_{A0}) - A_0R_{A2}}$$

in which $R_{A0}$, $R_{A2}$ are precision resistors substituted in said bridge circuit for said-sensor during a calibration mode; $A_0$, $A_2$ are corresponding readouts of said analog-to-digital converter; and $A_1$ is a readout of said analog-to-digital converter when a third precision resistor $R_{A1}$ equal to 0 is substituted in said bridge circuit for said sensor resistance ($R_T$).

5. The temperature indicating system defined in claim 4 in which said second modifying signal is computed in said microprocessor from an equation $$K_1 = \frac{(A_2 - A_1)(R_1 + R_{A2})}{R_{A2}}.$$

6. The temperature indicating system defined in claim 5 in which said third modifying signal is computed from said microprocessor from an equation $$K_2 = \frac{R_3}{R_2 + R_3} = \frac{-A_1}{K_1}.$$

7. The temperature indicating system defined in claim 4 in which said digital output signal from said microprocessor is computed in said microprocessor from an equation $$R_T = \frac{(A_T - A_1)R_1}{K_1 + A_1 - A_T}$$

in which $A_T$ is the readout from said analog-to-digital converter when the sensor resistance ($R_T$) is incorporated into said bridge circuit during a temperature measuring mode.

8. The temperature indicating system defined in claim 6 in which said digital output signal from said microprocessor is computed in said microprocessor from an equation $$R_T = \frac{(A_T - A_1)R_1}{K_1 + A_1 - A_T}$$

in which $A_T$ is the readout from said analog-to-digital converter when the sensor resistance ($R_T$) is incorporated into said bridge circuit during a temperature measuring mode.

9. The temperature indicating system defined in claim 6 in which the resistance $R'_{T0}$ of the temperature sensor at bath temperature $T_0$ is measured, the idealized resistance $R_{T0}$ of the temperature sensor at bath temperature $T_0$ is computed in the microprocessor, and a constant $K_F = R_{T0}/R'_{T0}$ is derived and stored in the memory, and in which said digital output signal from the microprocessor is computed in the microprocessor from an equation:

$$R_T = \left[ \frac{(A_T - A_1)R_1}{K_1 + A_1 - A_T} \right] K_F$$

in order to enhance the accuracy of the temperature indicating system over a narrow range of the order of ±15° C. about said bath temperature $T_0$.

10. The temperature indicating system defined in claim 6 in which a bath temperature $T_1$ is read by the temperature indicating system which results in a reading $T'_1$; and a constant $$K_H = \frac{(T_1' - T_1)}{(T_0 - T_1')}$$

is derived and stored in memory; and in which said digital output signal from the microprocessor is computed in the microprocessor from an equation:

$$T_x = T''_x + (T''_x - T_0)K_H$$

in order to enhance the accuracy of the temperature indicating system over an extended temperature range and to provide complete corrections at temperatures $T_0$ and $T_1$.

* * * * *